United States Patent [19]

Mohrman

[11] Patent Number: 4,998,675
[45] Date of Patent: Mar. 12, 1991

[54] SOLID WASTE PROCESSING UNIT

[76] Inventor: John H. Mohrman, Willow St., P.O. Box 280, Middleport, Pa. 17953

[21] Appl. No.: 443,007

[22] Filed: Nov. 29, 1989

[51] Int. Cl.$^5$ .............................................. B02C 25/00
[52] U.S. Cl. ..................... 241/36; 241/79.1; 241/101.2; 241/157; 241/257 R; 241/261.1; 241/DIG. 38
[58] Field of Search .............. 241/DIG. 38, 79.1, 100, 241/101.2, 36, 152 A, 158, 76, 78, 101.7, 157, 257 R, 261.1

[56] References Cited

U.S. PATENT DOCUMENTS

| 2,558,255 | 6/1951 | Johnson et al. | 241/36 X |
| 3,703,970 | 11/1972 | Benson | 241/36 X |
| 4,650,128 | 3/1987 | Goldhammer | 241/36 |

FOREIGN PATENT DOCUMENTS 15025  8/1935  Australia .............................. 241/78

Primary Examiner—Mark Rosenbaum

[57] ABSTRACT

The solid waste processing unit will reduce normal waste stream solids, all considered to be nonedible garbage, to 10–15 percent of the original volume ready for recycling or disposal. The unit can be placed in any location and can be manufactured to meet any capacity. The unit crushes, tears and shreds solid waste in a disintegrator which is composed of two sections. The first is a stationary chamber and the second is top cone-shaped drum rotating at high speed and high torque within the stationary chamber. Both sections are equipped with elliptical-patterned cutting heads and the waste is forced down through the chamber by the drum until it is ground into material for sizing in a rotating screening cylinder. The rotating screening cyclinder sizes and sorts the material into storage bins below with the aid of a fan to expedite the screening process. If the screened and sorted waste fills the compartmentized bins to capacity the system is stopped by electrical means. A traversing compactor assembly is moved manually to each bin to be emptied. That assembly is equipped with safety switches that will not allow the two rollers used for compaction to be powered until the assembly is properly locked in place in a bin. The compactor assembly will automatically stop operation when a bin becomes empty. All components of the unit are enclosed in a double-walled insulated compartment.

8 Claims, 4 Drawing Sheets

SOLID WASTE PROCESSING UNIT

This invention relates to the processing of solid waste. More particularly, this invention relates to a unit which will process solid waste as it is deposited in the unit in structures or on mobile appurtances. Such processing to result in solid waste being disintegrated, particles or pieces being sorted and finally compacted into material ready for re-manufacture or use in the compacted state.

Heretofore, solid waste consisting of food or liquid metal containers, aluminum containers, glass or plastic items, paper and cardboard and all other food and liquid containers were picked up at curbside by garbage haulers and dumped into landfills. This invention makes processing of all solid waste, except food waste, steel or cast metal and discarded appliances or furniture, possible at the source. That is to process solid waste deposited in the unit from a permanent or mobile location.

Further, use of this invention eliminates the need for bagging solid waste and having it picked up at curbside. It eliminates the stringent requirements to operate landfills and for the landfills themselves. Besides improving the environment, this invention will allow the user the capability to process their own solid waste or waste from multiple users into a form or state where such waste is ready for re-manufacture or use in the compacted state. Because of the storage capability of the unit, the processed solid waste can remain stored or compacted at the source for extensive periods of time. The unit is activated by use of electricity which eliminates the need for fossil fuel use. However, when mobile, the unit can be powered by fossil fuel driven engines or by use of portable fossil fuel driven electric generators. Envisioned in the invention is that periodically the sorted compacted solid waste would be transported in weight or volume capacities heretofore impossible to consumers of such products.

It is the object of the invention to provide a unit consisting of multiple major components for persons or municipalities to process their own solid waste.

A further object of the invention is to provide a unit consisting of multiple major components for person(s) in isolated locations or suburbs to process their own solid waste.

A further object of the invention is to provide a unit that will serve to reduce the present-day costs of disposing of solid waste and to process the solid waste to the point that it may be sold to consumer-manufacturers.

A further object of the invention is to provide a unit to process solid waste that is simple and safe to operate.

Another object of the invention is to provide a unit for processing solid waste that will reduce the cubage measurements of the solid waste.

Another object of the invention is to provide a unit for processing solid waste to reduce the cubic volume which will serve to improve the environment.

Further objects and advantages of the invention will be apparent upon reading the following description of a physical embodiment of the invention illustrated in the accompanying drawings wherein.

Figure 6:
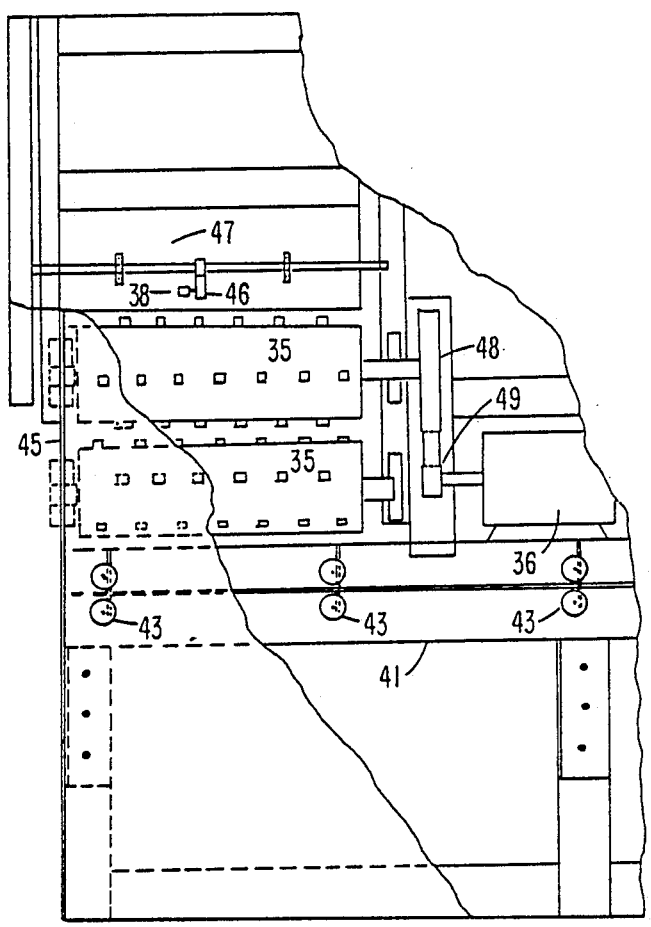
Figure 7:
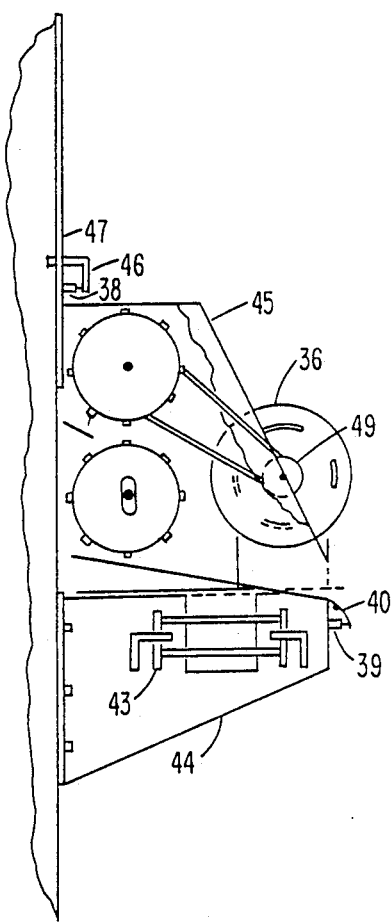
Figure 8:
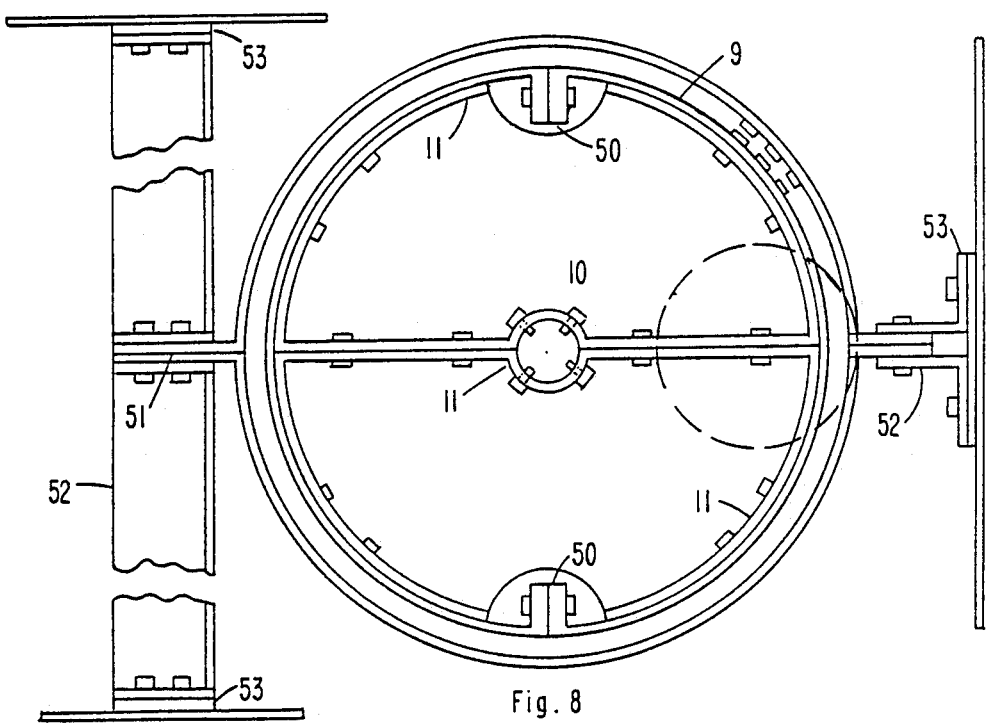
Figure 9:
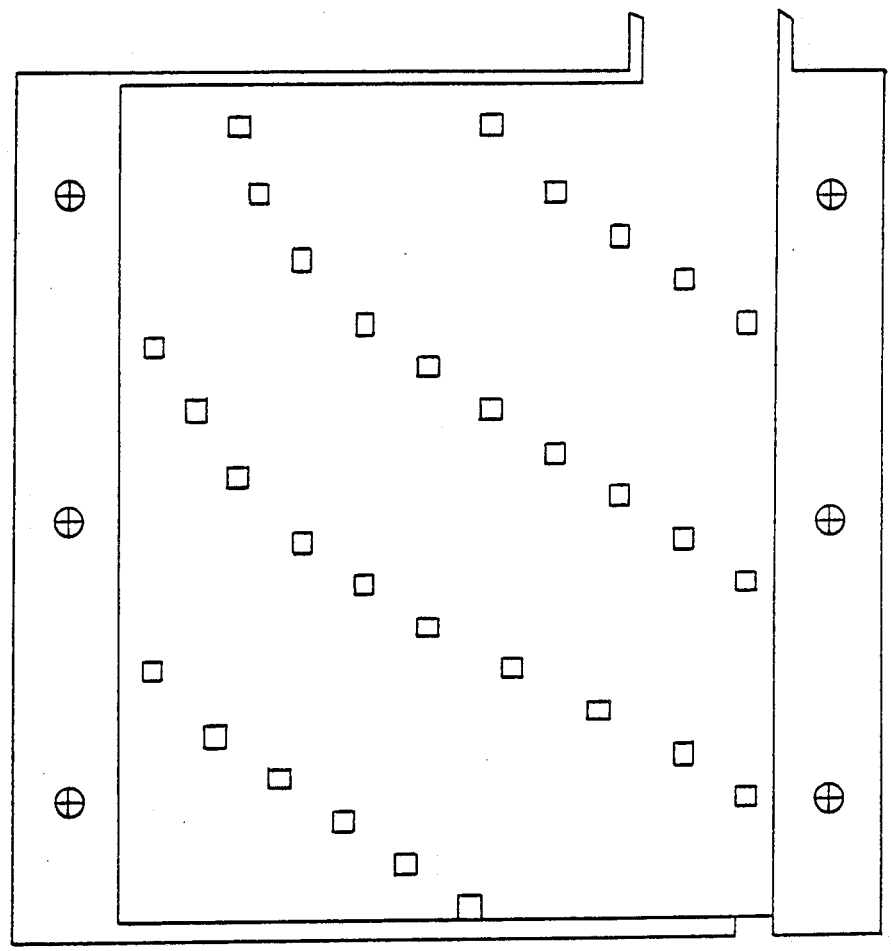
Figure 10:
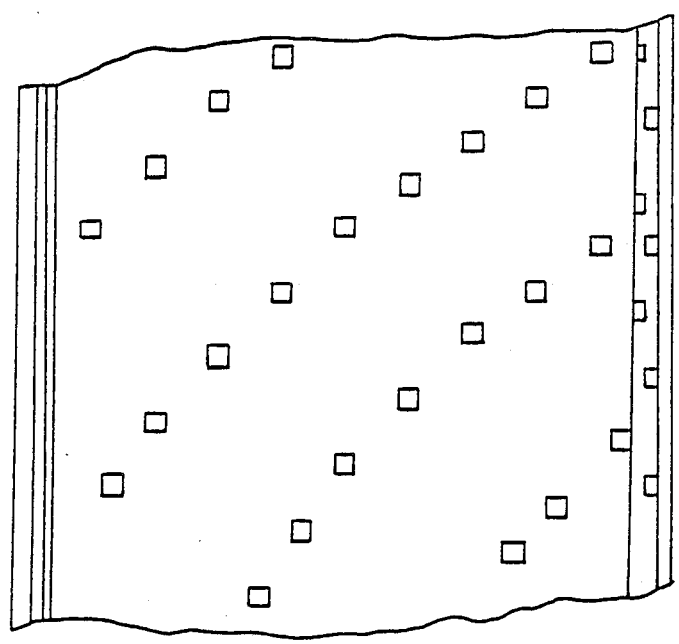

FIGS. 6 and 7 respectively are enlarged cut front and side sectional views of the compactor assembly;

FIG. 8 is an enlarged sectional view of the disintegrator assembly;

FIG. 9 is an enlarged cut sectional view of the stationary disintegrator housing sub-assembly;

FIG. 10 is an enlarged cut sectional view of the stationary and rotating disintegrator sub-assemblies.

Briefly stated, the invention is composed of master electrical safety controls on or near the location of the solid waste depository and/or the unit housing. With the master switch turned on, the primary electric motor is power activated driving the disintegrator and sorting assemblies. As the master switch is activated, the magnetic switch on the lid of the unit depository is released and solid waste can be inserted into the unit. When electrical power is off the magnetic switch is not activated and the lid to the unit depository cannot be opened. In the event a storage bin becomes full of sorted material and requires that it be emptied, a switch is activated by the full-bin plate and the unit cannot be activated by turning the master switch to the on position. Cleansed containers and other solid waste is inserted into the unit depository tube to be fed into the disintegrator assembly. Upon entering the disintegrator the waste is crushed, shredded and torn into parts and pieces. That material offering most resistance while in the disintegrator will be reduced to the smaller size particles or pieces. The diagonal pattern of the crushing and cutting bolt-heads in the disintegrator insure that the waste is properly reduced to particles or pieces as the cylinder rotates within the housing of that assembly. As the crushed and torn particles and pieces of waste leave the bottom of the disintegrator, the waste enters the rotating dimensionally screened sorting assembly. The waste is screened to size and weight by the sorting assembly with the assistance of an air fan at the end of the sorting assembly receiving the waste. The fan serves to move larger and lighter pieces of waste through the sorting assembly for more rapid sorting action to take place. As the sorted material passes through the dimensioned screening of the sorting assembly, deflector hoops on the rotating cylinder assist in maintaining the dimensioned sorting action. The material entering each bin is stored there until a sufficient quantity is available for compaction processing. The compactor assembly can be moved by hand from one waste storage bin to another. As the requirement to empty a bin arises, the compactor assembly is moved directly in front of the bin door. As the bin door is raised the upper portion of the compactor assembly is pushed by hand into the opening and locked in place by turning the locking handle clockwise. The compactor assembly motor is activated by a seperate electrical switch when it is locked in place in a bin opening. As the compactor assembly is activated, the material is compacted by the rollers. As the material leaves the rollers it is deposited in suitable containers for transporting to other locations.

The processing of solid waste through the unit reduces the over-all cubic volume of such waste by a minimum of 85%–90% during the three-phase operation of the plant. The first phase consists of waste being processed through the disintegrator. The second phase is the sorting of the particles and pieces of waste into the storage bins. The third phase is further reducing the cubic volume of the waste through use of the compactor. As a further safety feature, the compactor drive motor will be automatically deactivated when no additional waste from the storage bin leaves the compressing rollers of the compactor.

Figure 1:
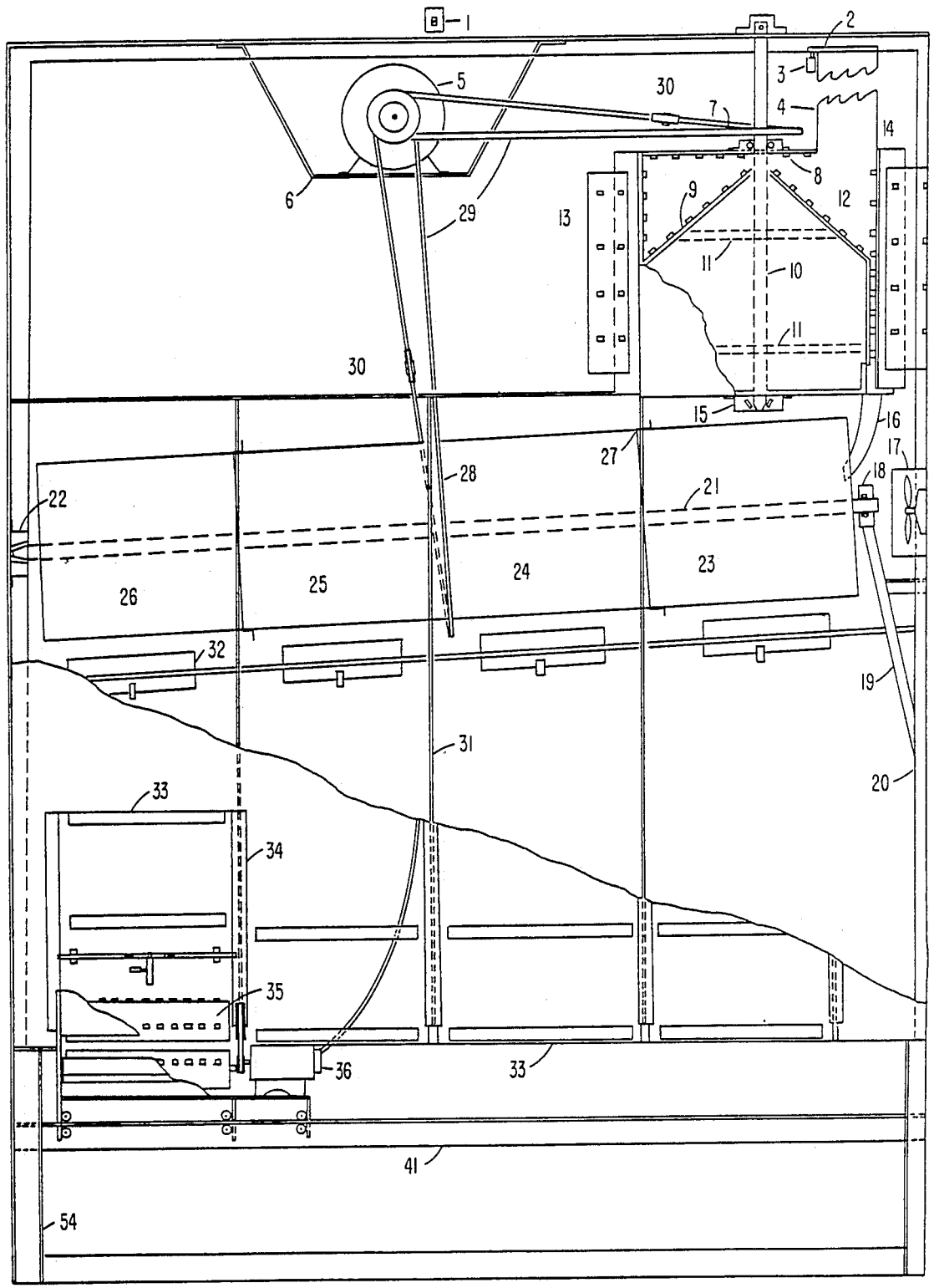
FIG. 1 is a cut front view of the unit according to the invention including major components, assemblies and sub-assemblies of the unit.
Figure 2:
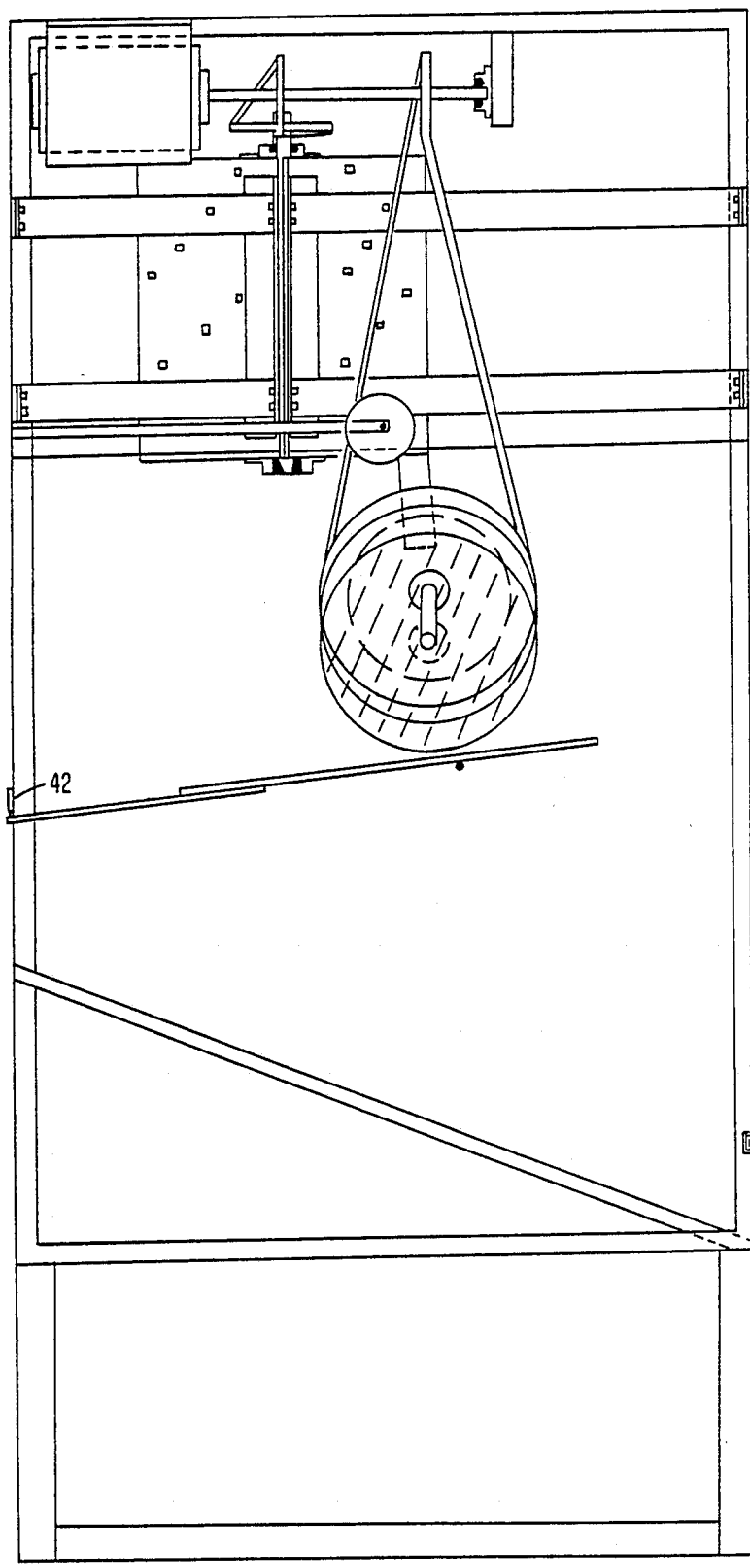
FIG. 2 is a cut side view sectional of the unit depicting component assembly and sub-assembly locations.

Referring to FIGS. 1 and 2, the main switch 1 controls electrical power to the magnetic switch 3 and to the drive motor 5 and power to the compactor drive motor switch 37. The main switch 1 is functional only if the safety full-bin switch(es) 42 remain in a closed or on position. When the compactor drive motor switch 37 is in the on position, the compactor drive motor 36 will not operate until the locking lever 46 is turned in a locked vertical position closing compactor drive motor switch 38. Switch 39 is a time-delay switch which will remain in a closed position until pressure from plate 40 is exerted. When pressure on plate 40 is released switch 39 will open and stop the drive motor.

Continuing to refer to FIG. 1, 2 designates the hinged cover of the depository to the unit interior mechanisms. This cover cannot be opened when the master switch is off. The size of the circular tube 4 from the cover to the interior of the disintegrator must be of a large enough diameter to allow insertion of most solid waste items and be long enough to prevent injury to persons who may attempt to insert arms or legs into the tube. The tube may be of plastic or metal. The main drive motor 5, is an electric motor supported by and attached to 6 with bolts. 6 is bolted to the main unit housing. 7 is a V-belt pulley twice the diameter of the drive motor pulley, attached to a solid steel shaft 10, which propells and is attached to the revolving disintegrator cylinder 9. The shaft rests on 15 which is a thrust bearing and rotates within a ball bearing 8, at the top of the shaft. Each bearing is enclosed in a bearing cover bolted to the disintegrator housing 12. The disintegrator shaft extends through an opening in the unit housing top. The shaft has a hole drilled through it to be used in conjunction with a manually inserted rod to rotate the disintegrator cylinder in the event it became jammed. A metal cover is bolted over the shaft end. Both the revolving disintegrator cylinder and the housing are made in two pieces with heavy cast steel walls with patterned holes for square headed case-hardened bolts to be installed. Each half of the revolving cylinder contains interior flanges which are bolted together during assembly and have two flanged half-circles 11, that are bolted to the center shaft and serve as structural reinforcement for the cylinder when completely assembled. The disintegrator housing is also made in two sections with outer flanges. The body of the housing contains a pattern of holes to receive the same size and type bolts as used in the revolving cylinder. As the cylinder revolves, the bolt heads on each component have a minimum clearance between those in the revolving cylinder and those in the housing. The bolt heads serve to crush, tear and demolish the items of solid waste. As the particles and pieces are ground smaller they gravitate to the bottom of the housing opening and leave the disintegrator through the steel curved pipe 16, attached to the bottom of the disintegrator housing with bolts.

The curved diagonal pattern of the disintegrator bolt-head cutters is shown in the cut sectional views of FIG. 9 for the stationary housing sub-assembly and in FIG. 10 for the stationary and the rotating cylinder sub-assemblies. Those bolts are easy to replace periodically. FIG. 8 is an enlarged cut plan view of the disintegrator housing and rotating cylinder showing the internal flanges 50 for connecting sections of the rotating cylinder and external flanges 51 and bracing for the housing of the disintegrator 52. The bracing attachment to the unit housing as reflected in FIGS. 2 and 8 shows a resilient material 53 between the steel bracing and the unit housing to reduce both vibration and noise from the operation of the disintegrator.

Figure 3:
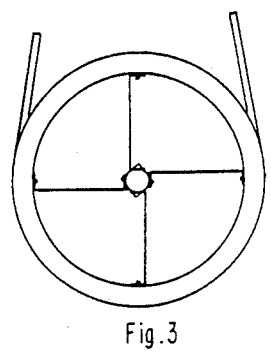
FIG. 3 is a side view of the drive hoop for the sorting assembly.
Figure 4:
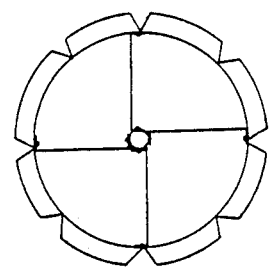
FIG. 4 is a side view of one of the deflector hoops for the sorting assembly.
Figure 5:
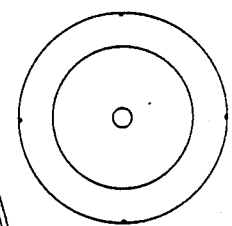
FIG. 5 is a side view of the top retainer flange for the sorting assembly.

Again referring to FIGS. 1 and 2, the sorting assembly is driven by a V-belt pulley mounted on the main drive motor shaft. The drive pulley causes the sorting cylinder to rotate on an appropriate drive ratio by V-belt 29 rotating the drive hoop shown as 28 in FIG. 1 and in FIG. 3. Pulleys shown as 30 are to adjust tension on the V-drive belts. The sorting assembly consists of a select quantity of different dimensioned sections of punched-hole sheet steel screening material. Sections 23, 24, 25 and 26 represent examples of those graduated sizes from the smallest at the upper end to the largest at the lower end. Each screen section is supported by and attached to the screening drum shaft 21 by steel strap material as shown in the center of FIGS. 3 and 4. 27 in FIG. 1 shows the sections of screening are over-lapped at the points they are supported and the steel deflector hoops are shown in FIG. 4. The drum shaft 21 is a steel pipe beveled at the lower end to revolve in a thrust bearing 22 which is housed in a bearing cover attached to 20 the unit housing. The higher end of the pipe shaft 21 rotates in an encased ball-bearing 18 which is supported by angle steel braces 19 in a "V" shape attached to 20 the unit housing. As shown in FIG. 5 the upper end of the sorting assembly contains a steel sheet metal flange at the top edge to prevent material coming from the disintegrator from falling out of the upper end of the assembly. The lower outer end of the screening drum is closed with steel sheet metal attached to the drum bracing. The fan 17 is a single speed unit enclosed in a sheet metal box attached to 20 the unit housing. The face of the fan box toward the screening drum is open for air passage but is covered with hardware cloth to protect the fan blades from debris.

Again referring to FIG. 1, the unit housing 20 is constructed of sheet steel, including the collection bin configuration, reinforced with steel angle iron welded at all seams and corner reinforcing. 54 is a steel angle iron support form for the unit and is made to the height desired for installation. 32 are bin over-load plates that are forced upward when a particular bin becomes too full to continue operation of the unit. Those plates are attached to a common pipe shaft that traverses the entire width of the unit housing. Each plate has a steel rod welded to it as shown in FIG. 2. The rod protrudes through a slot in the housing. As a plate is forced upward it opens switch 42 and shuts off all power to the unit. In FIG. 1, 33 are steel plate doors that cover the bin openings for unloading each bin. Each door is reinforced by welded sections of steel strap material, welded at the top only. 34 is the same material as the door reinforcing screwed to the unit housing at the point of each bin seperator or side with spacing washers between the guides and the unit housing to allow the bin doors to slide up and down. The entire front section of the unit housing is bolted in position so that it can be removed for repair or servicing of assemblies or sub-assemblies.

In reference to FIGS. 1 and 2 and enlarged in FIGS. 6 and 7 the compaction assembly consists of two rollers 35 made up of appropriate size steel pipe sections, with circular flanged ends with steel shafts welded to the flanged circular ends. The flanged ends are attached to the shafts by welding and the flanged circular ends are bolted to the pipe rollers. The pipe rollers contain drilled holes to receive case-hardened bolts as used in the disintegrator.

The pattern of the bolt holes are horizontally aligned as shown in FIGS. 1, 6 and 7. The top roller is driven by an electric motor using a V-belt and pulleys. The bottom roller is not driven but rotates as material to be compacted is fed into the adjustable space between the rollers by rotation of the top roller. The shafts of each roller rotate in bushings which are vertically adjustable on the bottom roller only. The bushings are contained in a casing attached to 45, the compactor assembly sheet metal reinforced housing. 37, 38 and 39 are the assembly electrical switches for activating and deactivating the drive motor as outlined hereinabove. 46 is the bin opening filler plate which is locked in place as the assembly is moved on the steel rollers 43 riding on 41 which are steel angle pieces serving as rails for the compactor assembly. The angle rails are supported by welding to bracing 44, which is bolted to four legs of the total unit bottom support frame. 40 is a hinged sheet metal flange which presses on time-delay switch 39 when the weight of material coming out of the rollers is on the flange. Such action causes switch 39 to remain in a closed position until material ceases to come from the rollers and the switch spring action causes the switch to open and shut off the drive motor. An appropriate ratio is set between the top roller pulley and the pulley on the motor shaft. The drive motor 36 is mounted and bolted to slotted openings in the assembly base to allow V-belt tension adjustment to be made as necessary. The assembly wheels 43, contain roller bearings encased in the pressed steel wheel housing. The wheels 43 rotate on fixed axles which are threaded at each end and held in place by bolts and washers. The axles are attached to the assembly frame by welds.

What is claimed is:

1. A solid waste processing unit for receiving unedible solid waste stream items comprising in combination:
   a waste disintegrator, said disintegrator having a depository opening at the top and a discharge tube at the bottom, a stationary circular chamber and a rotating top cone-shaped drum mounted within said chamber, both equipped with elliptical-patterned cutting heads, wherein above waste entering at the top gravitates downward first between the cone-shaped rotating drum and the stationary circular chamber and being crushed, torn and shredded to smaller size enters the vertical area between said drum and chamber whereby the aforesaid process is continued as waste enters the discharge tube;
   said rotating drum mounted on a shaft held in place by bearings and propelled by a V-belt flange mounted on the shaft top end powered by an electric motor;
   electrical switch means associated with said waste disintegrator to activate the processing unit and allow the lid on a depository opening to be released to receive waste;
   a multi-dimensioned rotating screening cylinder mounted on a pipe shaft in a slanted position with each shaft end in bearings and driven by a V-belt shaped hoop also powered by the electric motor powering the disintegrator described hereinabove;
   said screening cylinder receiving disintegrated waste via the waste disintegrator discharge tube into the higher end of the cylinder thereby in process sorting particles and pieces of waste by size and weight, said screening cylinder being in fluid communication with an air blowing fan positioned near the entry end of said screening cylinder for expediting the waste sorting process;
   compartmented bins below the screening cylinder receiving and storing the disintegrated and screen-sorted particles and pieces of waste, each bin containing a slanted bottom allowing said waste to be removed from the bin through a bin door;
   said compartmented bins having a means of shutting off electric power to the entire unit if any bin becomes completely filled with waste;
   a bin traversing compactor assembly equipped with rollers and powered by a drive motor to compact and feed hereinabove said screen-sorted particles and pieces of waste out of said compartmented bins into such form to allow removal;
   switch control means that prevents activation of the compactor drive motor if said compactor assembly is not properly connected to a compartmented bin opening; switch control means on the compactor assembly to deactivate said compactor drive motor when a compartmented bin is empty;
   a single double walled container housing all components hereinabove.

2. A solid waste processing unit as set forth in claim 1 wherein elements of the disintegrator contain a plurality of case hardened bolt heads which together, cooperate to crush, tear and shred the waste.

3. A solid waste processing unit as set forth in claim 2 wherein the waste is crushed, torn and shredded by the action of the disintegrator elements.

4. A solid waste processing unit as set forth in claim 1 wherein the screening cylinder comprises a plurality of deflector hoops to retain sized waste material within a specific area and that a closure at the lower end and a partial closure at the entry end retain waste in the aforesaid screening unit for sorting.

5. A solid waste processing unit as set forth in claim 4 wherein said deflector hoops are in fluid communication with the sorted sized waste.

6. A solid waste processing unit as set forth in claim 1 wherein the compartmented bins contain a plurality of baffle plates affixed to rods cantilevered at the axis of perpendicular attachment to a continuous rod through said bins.

7. A solid waste processing unit as set forth in claim 1 wherein the compactor assembly contains a plurality of rollers which, together, cooperate to compact or draw waste out of the unit.

8. A solid waste processing unit as set forth in claim 7 wherein said rollers contain a multiplicity of case hardened bolt heads to pull waste out of the unit.

* * * * *